United States Patent
Benson et al.

[11] Patent Number: 5,839,079
[45] Date of Patent: Nov. 17, 1998

[54] METHOD OF DECONTAMINATING A CEMENTITIOUS OR A METALLIC SURFACE

[75] Inventors: Jennifer Benson; Harry Eccles, both of Preston, United Kingdom

[73] Assignee: British Nuclear Fuels PLC, Cheshire, United Kingdom

[21] Appl. No.: 776,050
[22] PCT Filed: Jul. 27, 1995
[86] PCT No.: PCT/GB95/01772
 § 371 Date: Jan. 17, 1997
 § 102(e) Date: Jan. 17, 1997
[87] PCT Pub. No.: WO96/03754
 PCT Pub. Date: Feb. 8, 1996

[30] Foreign Application Priority Data

Jul. 28, 1994 [GB] United Kingdom ............ 9415213

[51] Int. Cl.⁶ .................................................. G21F 9/00
[52] U.S. Cl. ............... 588/18; 435/262.5; 976/DIG. 376
[58] Field of Search ...................... 588/1, 18; 134/2; 435/262, 262.5; 210/611, 610; 976/DIG. 376

[56] References Cited

U.S. PATENT DOCUMENTS

| 3,558,434 | 1/1971 | Herschler | 435/65 |
| 3,660,278 | 5/1972 | Mimura et al. | 210/611 |
| 5,292,456 | 3/1994 | Francis et al. | 588/12 |
| 5,414,196 | 5/1995 | Jennings | 588/1 |

FOREIGN PATENT DOCUMENTS

| A-2 60 528 | 6/1990 | France . |
| A-1-40 14 854 | 11/1911 | Germany . |
| A-43 12 906 | 10/1994 | Germany . |
| 2 261 316 | 5/1993 | United Kingdom . |

*Primary Examiner*—Ngoclan Mai
*Attorney, Agent, or Firm*—Oliff & Berridge, PLC

[57] ABSTRACT

A method for the decontamination of a cementitious or a metallic surface having contaminants is described. The method comprises the steps of supplying to said surface at least one microorganism under conditions conducive to growth of said at least one microorganism; maintaining said conditions conducive to growth of said microorganism and the generation of an acid or other metabolite to degrade said surface to a desired depth; terminating said conditions conducive to growth upon achieving at least said desired depth of degradation; removing the products of said degradation; treating said degradation products; and, disposing of said treated degradation products wherein the at least one microorganism is a citric acid generating microorganism.

13 Claims, 1 Drawing Sheet

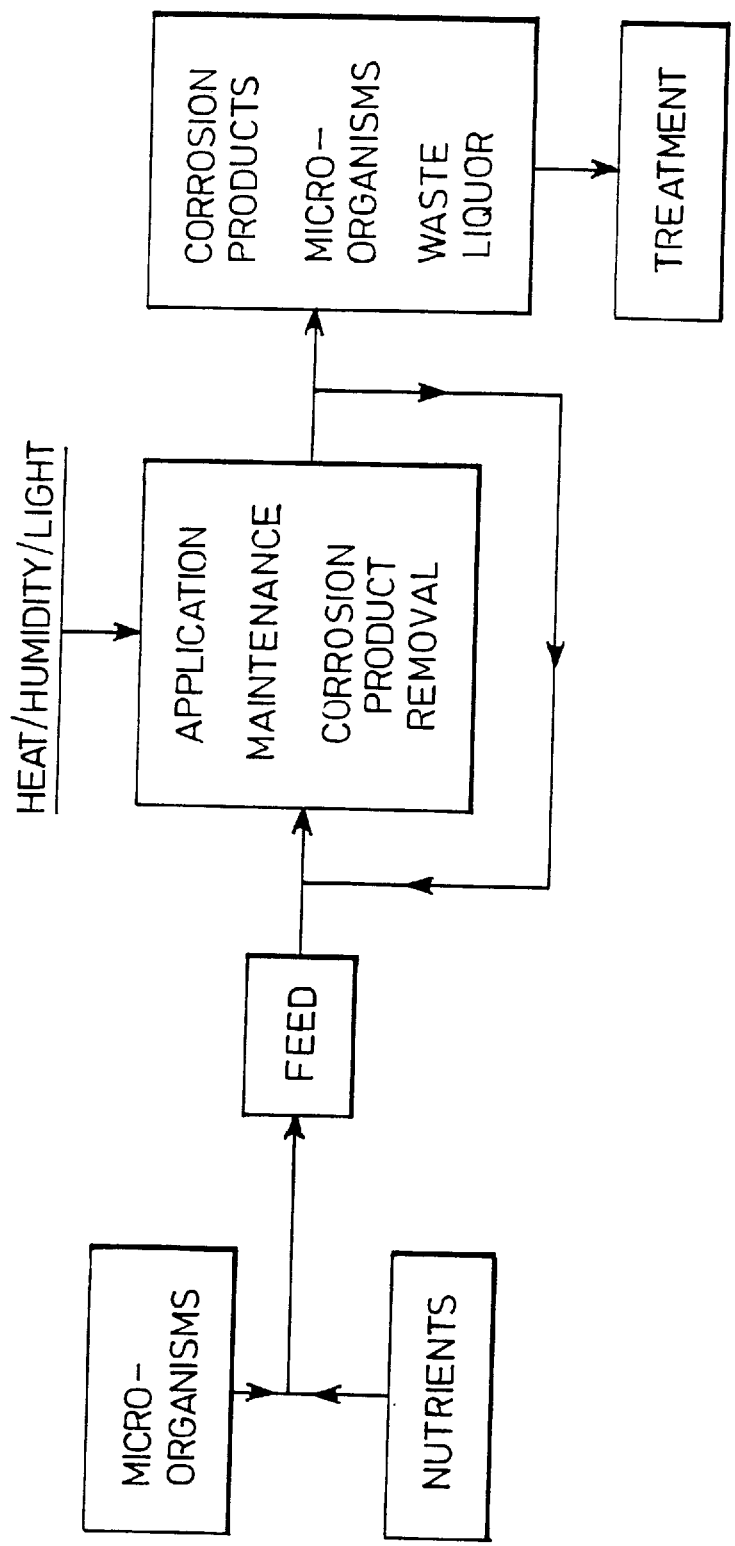

5,839,079

METHOD OF DECONTAMINATING A CEMENTITIOUS OR A METALLIC SURFACE

The present invention relates to a method for the decontamination of a cementitious or a metallic surface, particularly, though not exclusively, to the in-situ decontamination of such surfaces.

The decommissioning of chemical plants and reactors in the nuclear industry is an often lengthy and costly process, which desirably takes the site from closure to a state where it is free for other unrestricted use. Due to the very high costs involved with decommissioning, it is essential that decommissioning strategies are as cost effective as possible.

The decommissioning of, for example, a nuclear reactor or contaminated nuclear facilities is carried out in a number of stages. Firstly, fuel and accessible loose radioactive materials are removed from reactors and plant, then these and associated pieces of equipment are decontaminated as appropriate and dismantled; contaminated waste materials are disposed of and finally, the remaining buildings are demolished and the debris disposed of.

Contamination, as opposed to activation products, is located at the surface or accessible areas such as cracks and pores for example.

Decontaminating techniques are used within the decommissioning procedure to remove contaminants prior to demolition or re-use of buildings and other facilities for example. Decontamination is an important procedure because it not only reduces radiation dose rates within the working area, but also has the potential for reducing the impact of the waste and reclassification to a lower and less expensive category so as to achieve lower disposal costs. Reclassification of waste is achievable in the case of concrete and metal surfaces, for example, because the contaminants are concentrated at the exposed surfaces, near the surface or at accessible cracks. Therefore if those surfaces can be removed, the bulk of the remaining material can be disposed of as lower level waste.

Conventional methods for the decontamination of concrete surfaces have mainly employed physical methods such as shot blasting, scabbling, high pressure water jets, high energy processes such as lasers and plasmas, milling, sawing and explosives for example. Depending on the circumstances, each technique has its own advantages. However, common and inherent disadvantages are that these techniques generate comparatively large and difficult to manage volumes of waste; they are labour intensive and also involve high capital expenditure. Chemical methods employ aggressive materials and/or large volumes of liquid waste.

GB 2 261 316, of common ownership herewith, describes the decontamination of cementitious surfaces by the use of microorganisms to degrade the surface. The residue produced by such degradation being subsequently removed. This document is concerned with the use of sulphur oxidising bacteria to produce sulphuric acid to attack the surface.

However, the toxic materials which are being removed from the contaminated surface and the residue generated from the micro organisms or biomass are chemically separate and need to be dealt with separately.

Decontamination of metal surfaces has, in the past, been largely confined to washing down of surfaces with suitable chemicals, electrochemical, shot blasting, strippable coatings, ultrasonics and detergents for example.

We have now found that biosystems may be used which have particular and unforseen advantages.

According to the present invention there is provided a method for the decontamination of a cementitious or metallic surface having contaminants, the method comprising the steps of supplying to said surface at least one microorganism under conditions conducive to growth of said at least one microorganism; maintaining said conditions conducive to growth of said microorganism and the generation of an acid or other metabolites to degrade said surface to a desired depth; terminating said conditions conducive to growth upon achieving at least said desired depth of degradation, removing the products of said degradation; treating said degradation products; and, disposing of said treated degradation products, the method being characterised in that said at least one microorganism is a citric acid generating microorganism.

The depth of penetration of said contaminants may be up to about 20 mm.

Conditions conducive to the growth of the microorganisms may include aeration, temperature, light and humidity control and the provision of suitable nutrients to sustain growth.

According to the present invention, the generated acid is citric acid. Citric acid has the particular advantage of chelating with contaminant metal ions to remove them from the surface. Most heavy metal citrates are soluble in aqueous solutions, and therefore, are removed from the contaminated surface.

The generation of citric acid may be achieved by the use of strains of fungi, yeasts or bacteria, for example. Examples of the former may include Aspergillus spp. (such as A niger, A wentii, A carbonarius), Gliocladium spp., Trichoderma spp., Scopulariopsis spp., Paecilomyces spp., Penicillium spp. and Mucor spp., Saccharomycopsis lipolytica, Arthobacter spp. and Rhodococcus spp.

In the case of biodecontamination of metals such as mild steel, stainless steel, copper, aluminium and zircalloy, for example, the microorganisms may be applied to the contaminated surface prior to or after initial cleaning procedures to remove loose contamination. The microorganisms release the contaminants by a corrosion mechanism or by selective leaching. The microorganisms may also release contaminants that are held within cracks, fissures and/or at grain boundaries (produced during working or manufacture of the metal), which tend to be resistant to techniques that do not dissolve the surface by a corrosion or selective leaching mechanism. In the case of metals, aggressive metabolites (which are substances produced by metabolism) produced and held at the surface beneath a biofilm have more time to penetrate these surface features. Thus, as the contact time between the surface and the metabolite is also increased, decontamination will be further facilitated.

The inoculum of the at least one citric acid producing microorganism may be produced in either continuous, semi-batch or batch cultures. A bioreactor may be used to produce the inoculum. The inoculum may comprise a single microbial species or a consortium of species. In the case of fungal species, spores may be cropped from mature sporulating cultures and be made up into a spore suspension. Spore suspensions have the advantage that they may be kept for long periods at low temperatures. Thus, appropriate suspensions may be produced under controlled conditions in a laboratory and transported to the site where decontamination is required.

Immediately prior to the application of the microorganism to the surface to be decontaminated, the microbial inoculum and a suitable nutrient media may be mixed together to give a known concentration of cells or spores, the nutrient media providing nutrients which are not readily available from the cementitious or metallic surface. At this stage, the basic feed may be incorporated into a carrier medium for application to the surface to be decontaminated. Such carrier media may include paint, gel or foam matrices which will adhere to the surface to be decontaminated. Preferably, the carrier medium may include the nutrient source. The role of the carrier medium would also be to encourage initial microbial colonisation of the surface. Continued growth of the microorganism would be maintained by the supply of nutrient to the carrier and the maintenance of a suitable environment with regard to temperature and humidity for example.

In some circumstances it may be desirable to apply an initial pre-treatment to the contaminated surface so as to encourage colonisation by the acid producing bacteria. Such pre-treatment may take the form of a dilute acid or of a biofilm forming microbial culture. The biofilm is the layer which contains the bacteria and is effectively the environment in which the bacteria grow.

Application of the feed in its carrier medium may be by various techniques which may include:

(a) spraying the structure to be decontaminated, the spray ranging from mist to jet;

(b) flooding the structure and/or by a wet and dry cycle such as by pulsing the feed around the structure surface;

(c) trickle application of the feed over the surface;

(d) painting where the feed has been incorporated into a paint medium, the paint being applied by spraying as noted above or by brushing;

(e) where the feed has been produced as a gel, painting or spraying as noted above may be used; or (f) foam.

After the basic feed has been applied to the surface it is necessary to maintain the process until an acid-producing microbial biofilm is established. Once the biofilm has been established, nutrients continue to be applied. Such application may be by continuous, semi-batch or batch means.

Recycling of nutrients, for example, may also be appropriate to make the most cost effective use of materials.

During the decontamination process, it may also be necessary to remove degradation products and waste effluent from time to time or on a continuous basis until the desired amount or depth of degradation has been achieved. Alternatively, the degradation products may be removed at the end of a desired degradation cycle.

When the degree of degradation has been achieved, the process must be stopped. This can be achieved by removing or stopping the nutrient supply or by applying a sterilising process such as heat, pressure, irradiation or application of a biocide for example.

Removal of degradation products from the surface may be effected by various techniques including vacuum suction, scraping, scabbling, abrasion blasting, washing or by any other known technique appropriate to a wet or a dry process as used in any particular circumstances.

Treatment and separation of dead biomass, unused nutrients, solid and liquid waste forms may be achieved by known techniques such as filtration; chemical means , e.g. ion-exchange, distillation and precipitation for example; biological, e.g. biosorption, biodegradation, bioaccumulation and biotransformation for example.

The ultimate disposal of the treated biomass may be by any known technique, for example by cementation to reduce leach rate.

The method of the present invention may be employed to decontaminate surfaces contaminated with various kinds of hazardous material, for example, radioactive or non-radioactive heavy metal species.

Such metal species may include metal compounds and complexes as well as metals in elemental, alloy or ionic form.

Hazardous metal species which can be present as surface contaminants and treated in this way may include:

(i) actinides or their radioactive decay products or compounds thereof;

(ii) fission products;

(iii) toxic heavy metals or compounds thereof.

Actinides are elements having periodic numbers in the inclusive range 89 to 104.

The term "fission product" as used herein refers to those elements formed as direct products (or so-called "fission fragments") in the fission of nuclear fuel and products formed from such direct products by beta decay. Fission products include elements in the range from selenium to cerium including elements such as Ba, Zr, Te, Cs and Ce.

Non-radioactive heavy metals which can be present as contaminants on a surface treated by the method of the present invention may include toxic metals such as cobalt, chromium, lead, cadmium and mercury which are commonly found as contaminants around industrial plants.

In order that the present invention may be more fully understood, an example will now be described by way of illustration only with reference to the accompanying drawing which shows a schematic flow diagram of a process according to the present invention.

BRIEF DESCRIPTION OF THE DRAWING

The drawing shows a schematic flow diagram of a method according to the present invention wherein microorganisms and nutrients are brought together to prepare a feed stock. The feed stock is then applied to the surface to be decontaminated by any desired means such as spraying, flooding or in gel form for example. The growth of the microorganisms is maintained by repeated or continuous application of new feed stock or nutrients and the appropriate environmental conditions of heat, humidity or any other parameter are applied to maintain growth and generation of the required acid or metabolites. Degradation products generated during the decontamination procedure may be removed as the reaction progresses. Feed stock and/or nutrients may be recycled to maintain the reaction and to minimise cost and pollution from these sources. Once the required volume or depth of degradation has been achieved, the reaction may be terminated by cessation of supply of feed stock, nutrients or by applying conditions which kill the bacteria or fungi. Once the degradation reaction has ceased, the dead biomass formed during the process may be treated to separate and isolate the constituents as appropriate.

An example of the above is the decontamination of concrete where spores of *Aspergillus carbonarius* are applied in a suspension to a pre-treated surface, the pre-treatment being with a solution of a nutrient source such as a carbon source of sucrose or molasses for example. The citric acid produced as the spores germinate and the fungi grow, forms calcium citrate with the concrete, the calcium citrate being insoluble, and heavy metal citrates with most of the heavy metal contaminants which may be present on the surface. The soluble contaminant citrates are removed from the system by, for example, circulation of the liquor through a suitable treatment plant for removal of the heavy metal citrates. Solid degradation products may be removed by known techniques as discussed hereinabove.

We claim:

1. A method for the decontamination of a cementitious or metallic surface having contaminants, the method comprising the steps of supplying to said surface at least one microorganism under conditions conducive to growth of said at least one microorganism; maintaining said conditions conducive to growth of said microorganism and the generation of an acid or metabolites to degrade said surface to a desired depth; terminating said conditions conducive to growth upon achieving at least said desired depth of degradation; removing the products of said degradation; treating said degradation products; and, disposing of said treated degradation products, the method being characterised in that said at least one microorganism is a citric acid generating micro-organism.

2. A method according to claim 1 wherein the citric acid is produced from a fungi selected from the group consisting of Aspergillus spp., Gliocladium spp., Trichoderma spp., Scopulariopsis spp., Paecilomyces spp., Penicillium spp. and Mucor spp., Saccharomycopsis lipolytica, Arthobacter spp. and Rhodococcus spp.

3. A method according to claim 1 wherein the citric acid is produced from a yeast.

4. A method according to claim 1 wherein an inoculum is prepared remote from said surface to be decontaminated.

5. A method according to claim 4 wherein said inoculum is mixed with a nutrient media to form a feed stock prior to applying to said surface.

6. A method according to claim 4 wherein said inoculum is incorporated into a carrier medium.

7. A method according to claim 6 wherein said carrier medium is selected from one of a paint, or a foam.

8. A method according to claim 1 wherein said surface is pre-treated to encourage colonisation by said citric acid forming microorganism.

9. A method according to claim 8 wherein said pre-treatment is in the form of a biofilm forming microbial culture.

10. A method according to claim 8 wherein said surface is pre-treated with citric acid.

11. A method according to claim 8 wherein said surface is pre-treated with a carbon source.

12. A method according to claim 1 wherein said at least one citric acid generating microorganism is applied to the surface by a technique selected from the group consisting of spraying; flooding; trickling; and painting.

13. A method according to claim 5, wherein said feedstock is incorporated into a carrier medium.

* * * * *